Patented Apr. 1, 1952

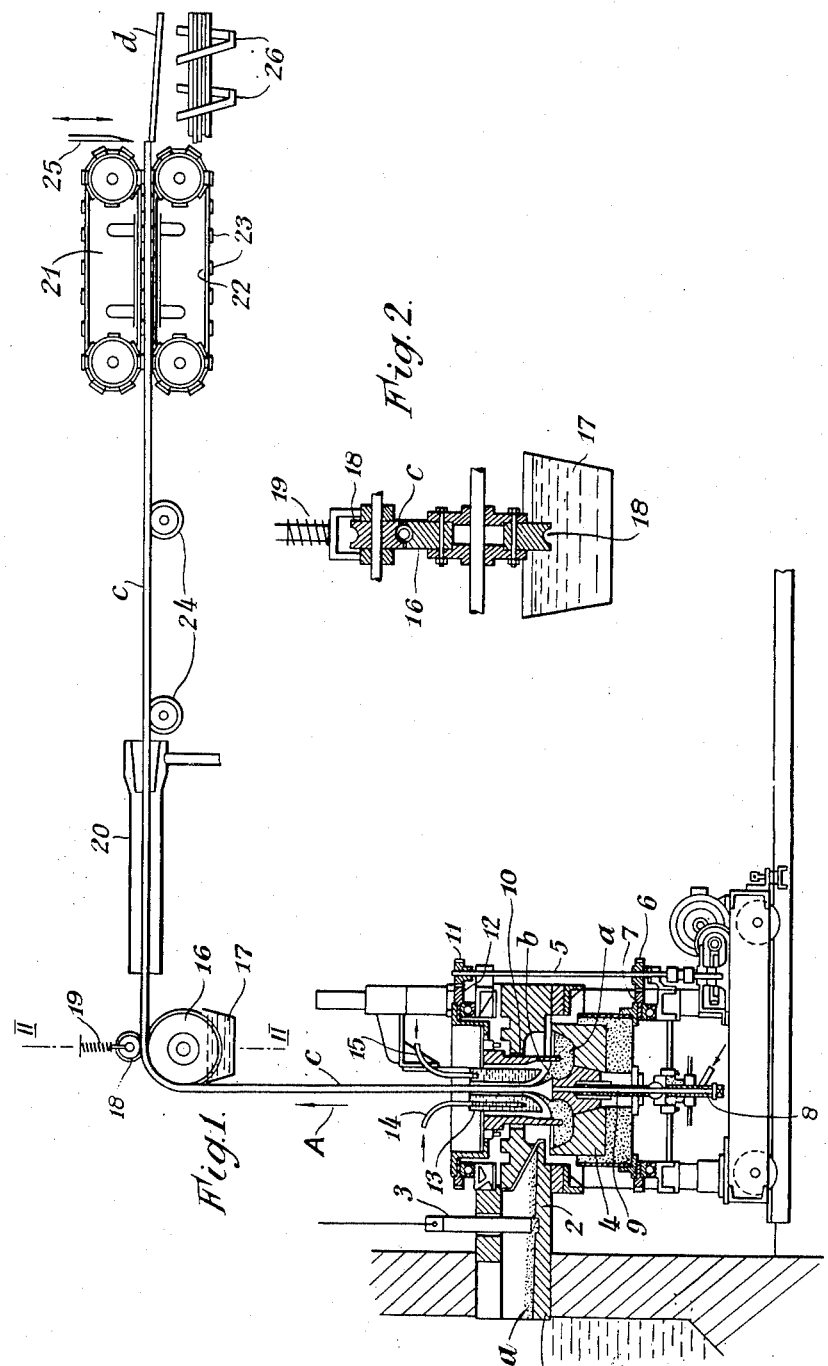

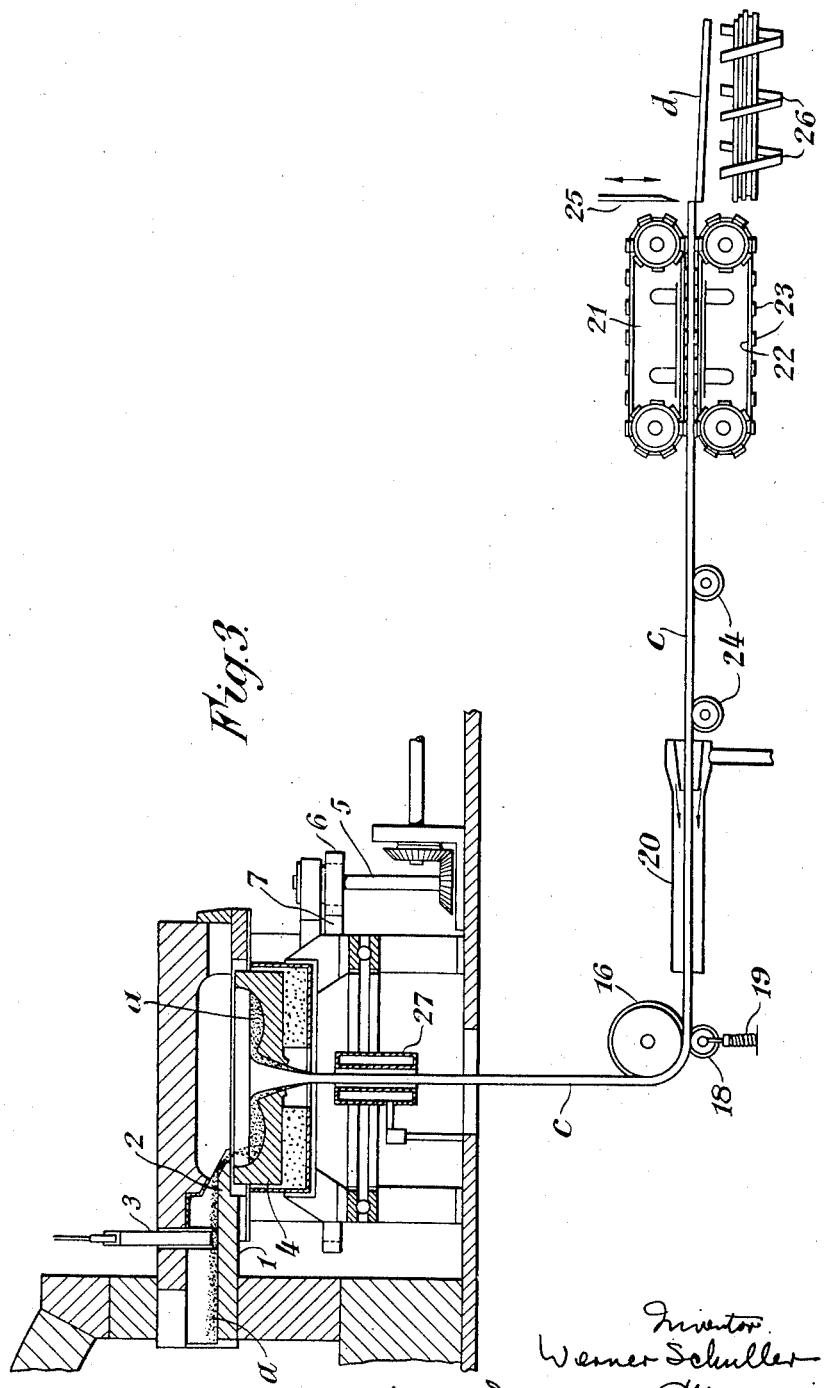

2,591,304

UNITED STATES PATENT OFFICE 2,591,304

DEVICE FOR THE PRODUCTION OF RODS AND TUBES FROM GLASS, PLASTIC OR LIKE SUBSTANCE

Werner Schuller, Banstead, England

Application April 19, 1949, Serial No. 88,474
In Great Britain April 19, 1948

3 Claims. (Cl. 49—17.1)

Rods or tubes made from glass or like substance, have hitherto been drawn out of a revolving drawing pot in a vertical direction, which compared with the method of drawing-out in a horizontal direction has the advantage that in its plastic condition, the rod or tube cannot bend under its own weight. A disadvantage of this process, however, is that such a plant operating in a vertical direction requires a lot of space, being either in the form of a tower or requiring several stories, either upwards or downwards. A further disadvantage lies in the difficulty experienced in cutting off determined lengths of rods or tubes from the uncut length that is in continuous movement at a fairly high speed, the individual rod or tube lengths having to be seized and—after cutting—carefully laid in a horizontal position. This is a complicated method. If sheared-off during operation, the entire glass column collapses, and much waste is caused, as the work has to be interrupted for a considerable time (from ¼ hour to 1 hour or more) until the process can be correctly re-started.

These disadvantages are overcome by the apparatus according to the invention, in which the rod or tubing is diverted in any desired direction, advantageously at right angles by mechanical means while still in a plastic condition and after being drawn a short distance in the vertical direction, into another direction, for example into the horizontal plane while being continually drawn, and is cut into determined lengths and stacked.

The invention is diagrammatically illustrated by way of example in the accompanying drawings, in which:

Figure 1 is a vertical longitudinal section through apparatus for the drawing of glass tubing, Figure 2 is a cross-section on an enlarged scale through a part of the apparatus on the line II—II of Figure 1, and Figure 3 is a vertical longitudinal section through a modified construction of apparatus for use in the manufacture of glass rods.

In the drawings, referring to Figure 1, 1 is a furnace for melting the glass, 2 a feeder channel from the furnace, and 3 a plug controlling the flow of the glass; 4 is a rotating drawing pot, which is kept in continuous rotation by means of a shaft 5, gearing 6 and toothed flange 7. 8 and 9 are pipes to deliver air under controlled pressure to the forming position of the glass tubing during the drawing process. $a$ is the glass in fluid condition in the furnace and drawing pot. It is for the purpose essential for the glass in the furnace and drawing pot to be maintained at a constant temperature which is determined in accordance with the quality of the glass and the required fluidity. 10 is a protective cylinder around the drawing position providing protection against the burners or other heating medium. The temperature outside the cylinder 10 may be between 750° C. and 1100° C., while inside the cylinder the temperature may fall to 400° C. at the position at which it leaves the cylinder. The cylinder 10 is shown as an immersion cylinder with the lower edge below the level of the fluid glass. It is kept rotating at the same speed as the drawing pot by gearing 11 and the interengaging toothed flange 12. 13 is a cooling means with an inlet 14 and outlet 15 for a coolant such for example as water.

At a position indicated by $b$ in the drawing, glass tubing $c$ is drawn upwardly and the tubing formed by a jet of air directed against the lower end face of the tubing as it rises in the direction of the arrow A. The process is the same for the drawing of rods except that no air jet is required.

After drawing a short distance in the vertical direction, the rod or tubing is diverted by mechanical means while still plastic into the horizontal direction. The distance at which the rod or tubing is diverted above the furnace may vary in accordance with the drawing speed and the effect of the cooling means. It may be from 3 to 6' above the furnace level, or more or less. For this purpose a diverting roller 16 is provided (which may be a profiled roller as shown in Figure 2), which is suitably cooled, for example, by rotating in a cooling water bath 17, the walls also serving to prevent the glass from sticking to the diverting roller. The roller 16 is preferably provided to work in conjunction with a guide roller 18 which applies a pressure under the influence of a spring 19. The distance of the diverting roller 16 from the drawing pot 4 is chosen so that the tubing $c$ is still in a plastic condition at this stage, and can, therefore, be diverted to some other direction, but the tubing is hard enough to prevent it being squeezed in the space between the profile walls of the diverting roller 18. Beyond the diverting roller 16 there is provided a cooling device 20 where the tubing $c$ is completely coagulated or solidified by means of any suitable cooling agent. 21 is a continuously operating drawing appliance and conveyor system with endless bands 22 and frictional and weight gripping members 23. 24 are supporting rollers for the solid tubing. Supported on the conveyor, predetermined lengths of tubing $d$, for example, of 1.50 m. or more or less in length, are cut by any convenient type of cutting means 25, and are deposited to lie horizontally in a collecting container 26.

The modification illustrated in Figure 3 corresponds substantially in form and operation to that illustrated in Figure 1, except that the length of rod or the tubing is drawn from below the drawing pot. 27 is a cooling appliance.

Apparatus according to the invention can easily be set up in a furnace house of normal height; it is easy for the operator to supervise a number of apparatus. If the rod or tubing breaks, there is little waste, and the drawing operation can very quickly be re-started. Owing to the horizontal position of the rods or tubing at the end of the drawing operation, it is possible to do the cutting without providing any additional means, as in known processes for removing the cut lengths of glass from a vertical position and stacking them horizontally and substantially without waste. It is thus also possible to operate at high speeds with consequently greater output.

I claim:

1. Apparatus for the continuous manufacture of elongated cylindrical products of glass and the like, comprising a glass furnace, a rotary glass drawing pot having a vertical axis of rotation for receiving molten glass from said glass furnace, means for drawing an elongated product from said pot, said means comprising a roller mounted on a horizontal axis spaced vertically from said pot and positioned with its periphery tangent to said vertical axis, and means horizontally spaced from said roller for exerting a drawing force on said elongated product, said last named means being so positioned that said elongated product is bent about the periphery of said roller as it passes from said pot to said last named means for exerting a drawing force.

2. Apparatus set forth in claim 1 wherein said drawing pot is a downwardly drawing pot and said roller is positioned beneath said drawing pot.

3. Apparatus set forth in claim 1 wherein said drawing pot is an upwardly drawing pot and said roller is positioned above said drawing pot.

WERNER SCHULLER.

REFERENCES CITED

The following references are of record in the file of this patent:

UNITED STATES PATENTS

| Number | Name | Date |
|---|---|---|
| 1,218,598 | Danner | Mar. 6, 1917 |
| 1,554,267 | Ewing | Sept. 22, 1925 |
| 1,571,216 | Soubier | Feb. 2, 1926 |
| 1,876,031 | Soubier | Sept. 6, 1932 |
| 2,009,326 | Sanchez-Vello | July 23, 1935 |
| 2,009,793 | Sanchez-Vello | July 30, 1935 |
| 2,085,245 | Woods | June 29, 1937 |
| 2,438,448 | Morton et al. | Mar. 23, 1948 |

FOREIGN PATENTS

| Number | Country | Date |
|---|---|---|
| 612,120 | France | July 24, 1926 |
| 660,433 | France | Feb. 19, 1929 |